US012051331B2

(12) United States Patent
Sheikh et al.

(10) Patent No.: US 12,051,331 B2
(45) Date of Patent: Jul. 30, 2024

(54) SYSTEM AND METHOD FOR A VEHICLE PROXIMITY ALERT

(71) Applicant: GM GLOBAL TECHNOLOGY OPERATIONS LLC, Detroit, MI (US)

(72) Inventors: Tooba A. Sheikh, Thornhill (CA); Negin Lashkari, Markham (CA)

(73) Assignee: GM Global Technology Operations LLC, Detroit, MI (US)

( * ) Notice: Subject to any disclaimer, the term of this patent is extended or adjusted under 35 U.S.C. 154(b) by 189 days.

(21) Appl. No.: 17/848,658

(22) Filed: Jun. 24, 2022

(65) Prior Publication Data

US 2023/0419836 A1 Dec. 28, 2023

(51) Int. Cl.
*G08G 1/16* (2006.01)

(52) U.S. Cl.
CPC .................................... *G08G 1/161* (2013.01)

(58) Field of Classification Search
CPC ..................................................... G08G 1/161
USPC ......................................................... 340/901
See application file for complete search history.

(56) References Cited

U.S. PATENT DOCUMENTS

2008/0150755 A1* 6/2008 Van Zandt ........... G08G 1/0965 340/902
2017/0032402 A1* 2/2017 Patsiokas ........... G06Q 30/0207

FOREIGN PATENT DOCUMENTS

| | | | |
|---|---|---|---|
| DE | 102015221361 | A1 | 4/2017 |
| DE | 102016200899 | A1 * | 7/2017 |
| DE | 102016200899 | A1 | 7/2017 |
| DE | 102017211923 | A1 | 2/2019 |
| DE | 102019110763 | A1 | 11/2019 |

* cited by examiner

*Primary Examiner* — Kam Wan Ma
(74) *Attorney, Agent, or Firm* — Quinn IP Law

(57) ABSTRACT

A method and system for a target vehicle that includes an extra-vehicle communication system, a passenger cabin including an interior audio system and a visual display, and a controller is described. The controller is in communication with the extra-vehicle communication system, and operably connected to the interior audio system and the visual display. The controller includes algorithmic code that is executable to receive a proximity alert from a second vehicle via the extra-vehicle communication system, determine a location vector between the second vehicle and the target vehicle based upon the proximity alert, and control the interior audio system and the visual display to generate an alarm in response to the proximity alert, wherein the alarm generated by the interior audio system and the visual display is directionally controlled based upon the location vector. The proximity alert may be generated by an operator, or by a spatial monitoring system.

20 Claims, 5 Drawing Sheets

SYSTEM AND METHOD FOR A VEHICLE PROXIMITY ALERT

INTRODUCTION

Vehicles are equipped with audible horns and other devices to alert operators of proximal vehicles of impending risks, e.g., collisions. In a high-density area or a dynamic operating environment, it may be difficult for an operator of a target vehicle to locate an impending risk that is being indicated by a horn, and thus may reduce the likelihood that the operator of the target vehicle is able to avoid a situation associated with the impending risk. Furthermore, audible horns contribute to noise pollution.

SUMMARY

The concepts described herein include a method, system, and apparatus that are arranged and configured to provide a directional, localized, vehicle-specific proximity alert to inform an operator of a target vehicle of an impending risk from a second vehicle. The proximity alert is communicated from the second vehicle via an extra-vehicle communication system, and is manifested as one or more of an audible alarm, a visual alarm and/or a haptic alarm within a passenger cabin of the target vehicle.

An aspect of the disclosure includes a system for a target vehicle that includes an extra-vehicle communication system, a passenger cabin including an interior audio system and a visual display, and a controller. The controller is in communication with the extra-vehicle communication system, and operably connected to the interior audio system and the visual display. The controller includes algorithmic code that is executable to receive a proximity alert from a second vehicle via the extra-vehicle communication system, determine a location vector between the second vehicle and the target vehicle based upon the proximity alert, and control the interior audio system and the visual display to generate an alarm in response to the proximity alert, wherein the alarm generated by the interior audio system and the visual display is directionally controlled based upon the location vector.

Another aspect of the disclosure includes a microphone arranged to monitor audio sound external to the target vehicle, wherein the controller is in communication with the extra-vehicle communication system and the microphone, and wherein the controller includes algorithmic code that is executable to receive the proximity alert from the second vehicle via at least one of the extra-vehicle communication system and the microphone.

Another aspect of the disclosure includes the extra-vehicle communication system being a telematics system arranged to execute vehicle-to-vehicle communication.

Another aspect of the disclosure includes the interior audio system being a stereo system including a first speaker disposed on a left side of the passenger cabin and a second speaker disposed on a right side of the passenger cabin.

Another aspect of the disclosure includes the controller including algorithmic code that is executable to determine an inter-aural time difference for a vehicle operator based upon the location vector between the second vehicle and the target vehicle, and control the first speaker and the second speaker to generate the alarm in response to the proximity alert based upon the inter-aural time difference for the vehicle operator.

Another aspect of the disclosure includes the visual display being one of a head-up display, a driver information center, vehicle interior lighting, sideview mirrors, or a rear-view mirror.

Another aspect of the disclosure includes the controller including algorithmic code that is executable to determine a location of the second vehicle based upon the location vector, and display, via the visual display, the location of the second vehicle.

Another aspect of the disclosure includes the controller being operably connected to the interior audio system and the visual display, and wherein the controller includes algorithmic code that is executable to control the interior audio system and the visual display to generate the alarm in the passenger cabin in response to the proximity alert, wherein an origin of the alarm from the interior audio system and the visual display is determined based upon the location vector.

Another aspect of the disclosure includes a plurality of haptic devices disposed in an operator seat, and the controller being operably connected to the plurality of haptic devices. The controller includes algorithmic code that is executable to control the plurality of haptic devices to generate the alarm in response to the proximity alert, wherein the alarm generated by the plurality of haptic devices is directionally controlled based upon the location vector.

Another aspect of the disclosure includes the controller including algorithmic code that is executable to control the interior audio system to generate the alarm in response to the proximity alert, wherein the alarm generated by the interior audio system is directionally controlled to mimic the proximity alert from the second vehicle.

Another aspect of the disclosure includes a system that includes a target vehicle and a second vehicle. The target vehicle includes a first communication system, a passenger cabin including an interior audio system and a visual display, and a first controller, the first controller being in communication with the first communication system, and operably connected to the interior audio system and the visual display. The second vehicle includes a second communication system, a proximity alert actuator, and a second controller, the second controller being in communication with the second communication system and the proximity alert actuator. The second controller includes algorithmic code that is executable to communicate a proximity alert to the first controller via the first and second communication systems. The first controller includes algorithmic code that is executable to determine a location vector between the second vehicle and the target vehicle based upon the proximity alert, and control the interior audio system and the visual display of the target vehicle to generate an alarm in response to the proximity alert, wherein the alarm generated by the interior audio system and the visual display is directionally controlled based upon the location vector.

Another aspect of the disclosure includes the second vehicle having a spatial monitoring system, wherein the proximity alert actuator is incorporated into the spatial monitoring system, and wherein the proximity alert is generated by the spatial monitoring system based upon a proximity of the target vehicle in relation to the second vehicle.

Another aspect of the disclosure includes the proximity alert actuator being a horn button, wherein the proximity alert is generated by operator actuation of the horn button.

The above summary is not intended to represent every possible embodiment or every aspect of the present disclosure. Rather, the foregoing summary is intended to exemplify some of the novel aspects and features disclosed herein. The above features and advantages, and other features and advantages of the present disclosure, will be readily apparent from the following detailed description of representative embodiments and modes for carrying out the present disclosure when taken in connection with the accompanying drawings and the claims.

BRIEF DESCRIPTION OF THE DRAWINGS

One or more embodiments will now be described, by way of example, with reference to the accompanying drawings, in which.

Figure 1:
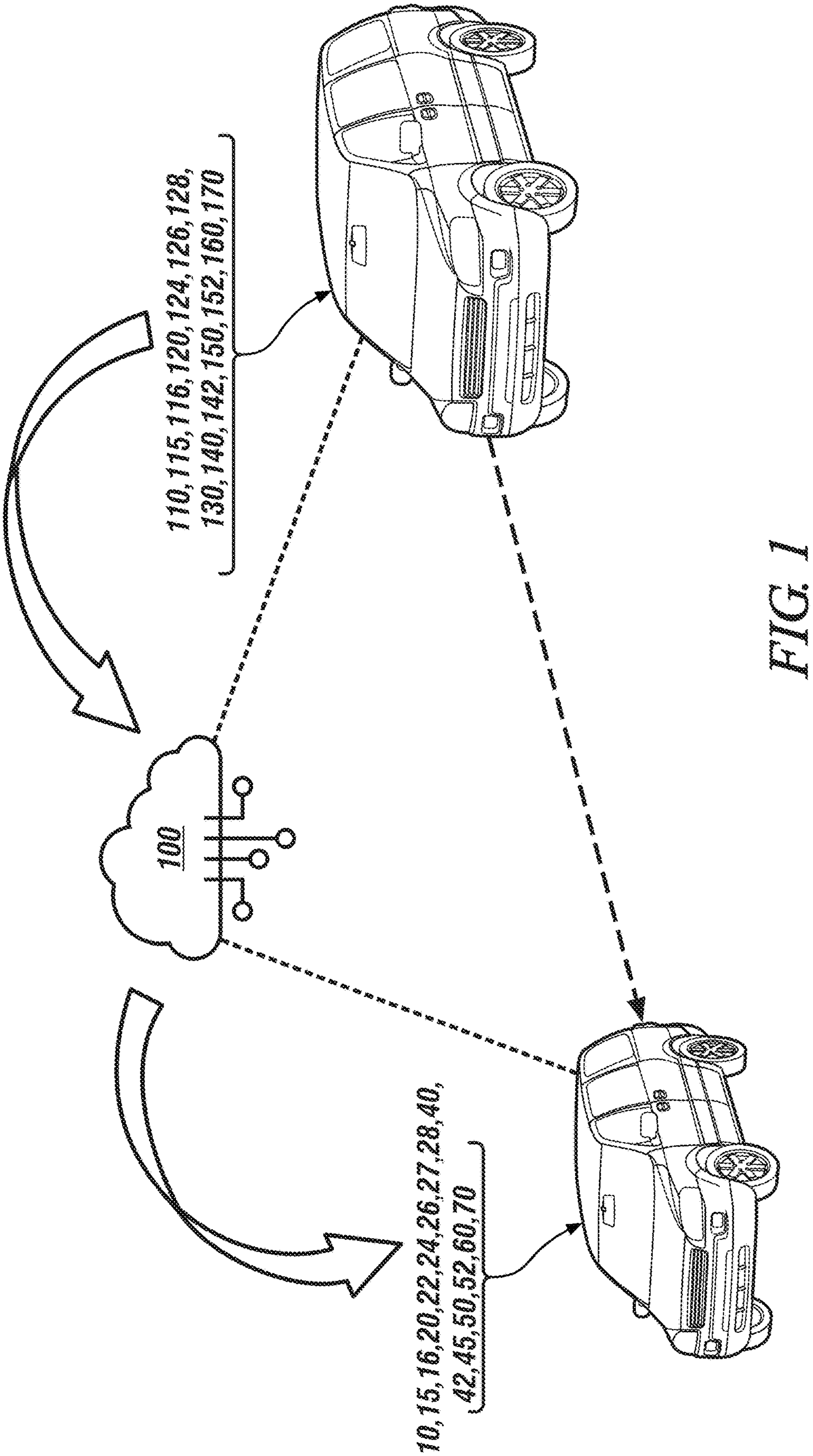
FIG. 1 pictorially illustrates a target vehicle and a second vehicle, in accordance with the disclosure.

The appended drawings are not necessarily to scale, and may present a somewhat simplified representation of various preferred features of the present disclosure as disclosed herein, including, for example, specific dimensions, orientations, locations, and shapes. Details associated with such features will be determined in part by the particular intended application and use environment.

DETAILED DESCRIPTION

The components of the disclosed embodiments, as described and illustrated herein, may be arranged and designed in a variety of different configurations. Thus, the following detailed description is not intended to limit the scope of the disclosure, as claimed, but is merely representative of possible embodiments thereof. In addition, while numerous specific details are set forth in the following description in order to provide a thorough understanding of the embodiments disclosed herein, some embodiments can be practiced without some of these details. Moreover, for the purpose of clarity, certain technical material that is understood in the related art has not been described in detail in order to avoid unnecessarily obscuring the disclosure.

Furthermore, directional terms such as top, bottom, left, right, up, over, above, below, beneath, rear, and front, may be used when referring to the drawings. These and similar directional terms are not to be construed to limit the scope of the disclosure. Furthermore, the disclosure, as illustrated and described herein, may be practiced in the absence of an element that is not specifically disclosed herein.

The following detailed description is merely exemplary in nature and is not intended to limit the application and uses. Furthermore, there is no intention to be bound by any expressed or implied theory presented herein. Throughout the drawings, corresponding reference numerals indicate like or corresponding parts and features.

As employed herein, the term "system" may refer to one of or a combination of mechanical and electrical actuators, sensors, controllers, application-specific integrated circuits (ASIC), combinatorial logic circuits, software, firmware, and/or other components that are arranged to provide the described functionality.

As employed herein, the term "operatively connected" indicates a relationship in which one element operates or otherwise controls actuation of another element employing one or a combination of mechanical, fluidic electrical, electronic, magnetic, digital, etc., forces to perform one or multiple tasks.

The use of ordinals such as first, second and third does not necessarily imply a ranked sense of order, but rather may only distinguish between multiple instances of an act or structure.

Referring to the drawings, wherein like reference numerals correspond to like or similar components throughout the several Figures, FIGS. 1, 2, 3, and 4, consistent with embodiments disclosed herein, schematically illustrate elements of a target vehicle 10 and a second vehicle 110 that is proximal to the target vehicle 10, with a location vector 80 depicted therebetween. In one embodiment, a wireless communication network 100 is arranged to effect communication between the target vehicle 10 and the second vehicle 110.

Figure 2:
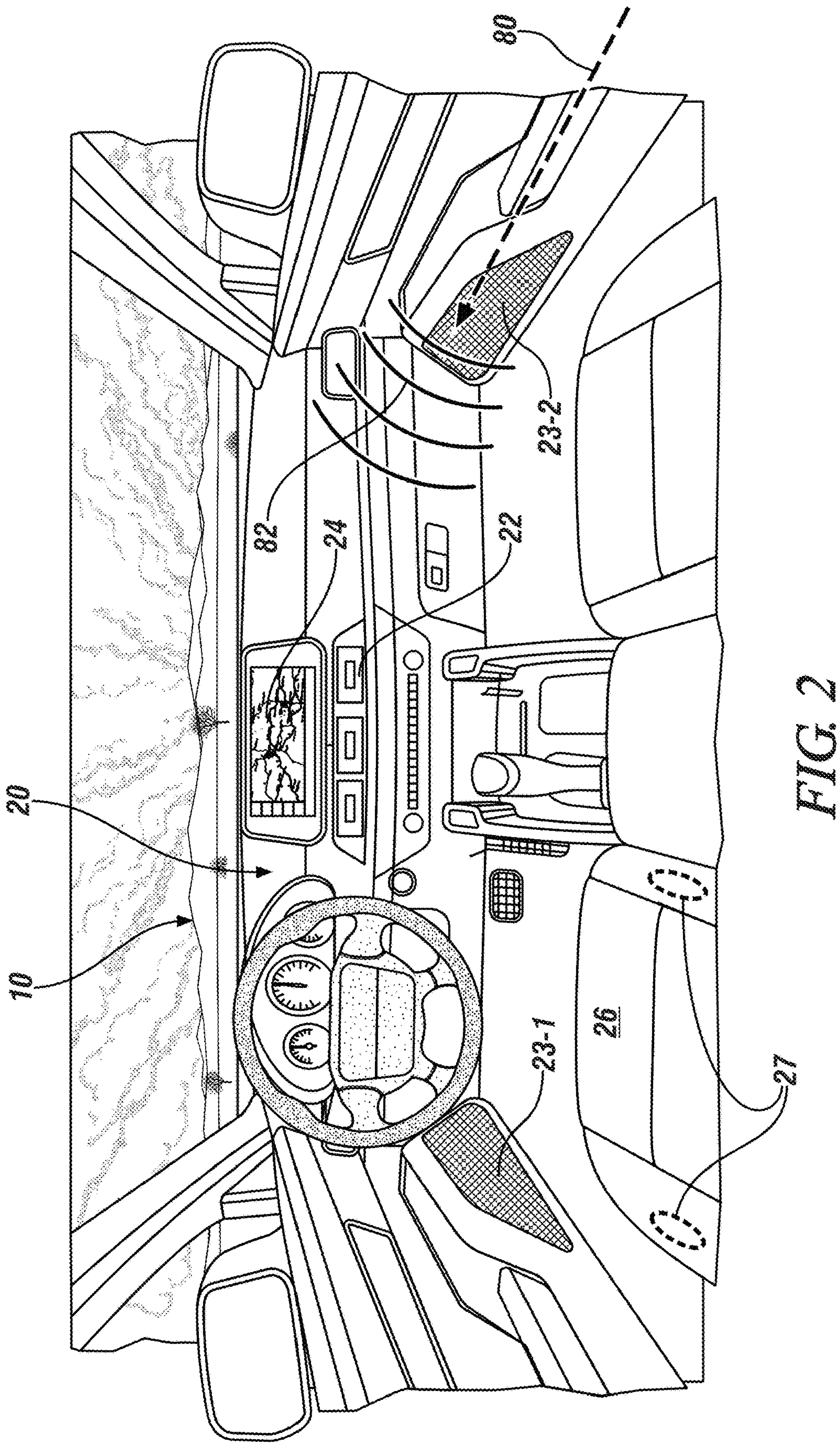
FIG. 2 pictorially illustrates an embodiment of a forward-facing portion of a passenger cabin for an embodiment of the target vehicle, in accordance with the disclosure.

The target vehicle 10 is disposed on and able to traverse a travel surface such as a paved road surface. The target vehicle 10 includes a passenger cabin 20 having a stereo audio system 22, a visual display system 24, a driver's seat 26, and a first controller 15 having executable code 16, in one embodiment. Other elements may include, in one or more embodiments, an advanced driver assistance system (ADAS) 40, a spatial monitoring system 42, a navigation system 50 including a global positioning system (GPS) sensor 52, a human/machine interface (HMI) system 60, and a telematics system 70. The visual display system 24 may be part of the HMI system 60 in one embodiment. In one embodiment, a microphone 45 is arranged to monitor audible sound around the exterior of the target vehicle 10. In one embodiment, the driver's seat 26 includes a plurality of haptic devices 27. FIG. 2 pictorially shows an embodiment of the passenger cabin 20 for an embodiment of the target vehicle 10, including the stereo audio system 22 with a left speaker 23-1 and a right speaker 23-2, visual display system 24, and driver's seat 26 with the plurality of haptic devices 27 disposed in a seat bottom and/or a seat back. An example of the location vector 80 is also illustrated, with a corresponding sound wave 82 emanating from the right speaker 23-2 of the stereo audio system 22. The visual display system 24 includes one or more of a driver information center, a head-up display, vehicle interior lighting, left and right sideview mirrors, a rear-view mirror, etc.

Referring again to FIG. 1, the second vehicle 110 is also disposed on and able to traverse a travel surface such as a paved road surface. The second vehicle 110 includes a passenger cabin 120 having a visual display system 124, a driver's seat 126, a proximity alert actuator 128 and second controller 115 having second executable code 116, in one embodiment. In one embodiment, the proximity alert actuator 128 is a horn button. Other elements may include an advanced driver assistance system (ADAS) 140, a spatial monitoring system 142, a navigation system 150 including a global positioning system (GPS) sensor 152, a human/machine interface (HMI) device 160, and a telematics system 170.

The target vehicle 10 and the second vehicle 110 may include, but not be limited to a mobile platform in the form of a commercial vehicle, industrial vehicle, agricultural vehicle, passenger vehicle, aircraft, watercraft, train, all-terrain vehicle, personal movement apparatus, robot and the like to accomplish the purposes of this disclosure.

In one embodiment, each of the spatial monitoring systems 42, 142 includes one or a plurality of spatial sensors and systems that are arranged to monitor a viewable region that is forward of the target vehicle 10 and the second vehicle 110, respectively, and a spatial monitoring controller. The spatial sensors that are arranged to monitor the viewable region include, e.g., a lidar sensor, a radar sensor, a digital camera, or another device. Each of the spatial sensors is disposed on-vehicle to monitor all or a portion of the viewable region to detect proximate remote objects such as road features, lane markers, buildings, pedestrians, road signs, traffic control lights and signs, other vehicles, and geographic features that are proximal to the target vehicle 10 and the second vehicle 110, respectively.

The spatial monitoring controller generates digital representations of the viewable region based upon data inputs from the spatial sensors. The spatial monitoring controller includes executable code to evaluate inputs from the spatial sensors to determine a linear range, relative speed, and trajectory of the target vehicle 10 or the second vehicle 110, respectively, in view of each proximate remote object. The spatial sensors can be located at various locations on the target vehicle 10 and the second vehicle 110, respectively, including the front corners, rear corners, rear sides and mid-sides. The spatial sensors can include a front radar sensor and a camera in one embodiment, although the disclosure is not so limited.

Placement of the spatial sensors permits the spatial monitoring controller to monitor traffic flow including proximate vehicles, intersections, lane markers, and other objects around the target vehicle 10 or the second vehicle 110, respectively. The spatial sensors of the vehicle spatial monitoring system 42 may include object-locating sensing devices including range sensors, such as FM-CW (Frequency Modulated Continuous Wave) radars, pulse and FSK (Frequency Shift Keying) radars, and Lidar (Light Detection and Ranging) devices, and ultrasonic devices which rely upon effects such as Doppler-effect measurements to locate forward objects. The possible object-locating devices include charged-coupled devices (CCD) or complementary metal oxide semi-conductor (CMOS) video image sensors, and other camera/video image processors which utilize digital photographic methods to 'view' forward objects including one or more vehicle(s).

The ADAS system 40 is configured to implement autonomous driving or advanced driver assistance system (ADAS) vehicle functionalities. Such functionality may include an on-vehicle control system that is capable of providing a level of driving automation. The terms 'driver' and 'operator' describe the person responsible for directing operation of the target vehicle 10 and the second vehicle 110, respectively, whether actively involved in controlling one or more vehicle functions or directing autonomous vehicle operation. Driving automation can include a range of dynamic driving and vehicle operation. Driving automation can include some level of automatic control or intervention related to a single vehicle function, such as steering, acceleration, and/or braking, with the driver continuously having overall control of the target vehicle 10. Driving automation can include some level of automatic control or intervention related to simultaneous control of multiple vehicle functions, such as steering, acceleration, and/or braking, with the driver continuously having overall control of the target vehicle 10 or the second vehicle 110, respectively. Driving automation can include simultaneous automatic control of vehicle driving functions that include steering, acceleration, and braking, wherein the driver cedes control of the vehicle for a period of time during a trip. Driving automation can include simultaneous automatic control of vehicle driving functions, including steering, acceleration, and braking, wherein the driver cedes control of the target vehicle 10 or the second vehicle 110, respectively, for an entire trip. Driving automation includes hardware and controllers configured to monitor the spatial environment under various driving modes to perform various driving tasks during dynamic vehicle operation. Driving automation can include, by way of non-limiting examples, cruise control, adaptive cruise control, lane-change warning, intervention and control, automatic parking, acceleration, braking, and the like. The autonomous vehicle functions include, by way of non-limiting examples, an adaptive cruise control (ACC) operation, lane guidance and lane keeping operation, lane change operation, steering assist operation, object avoidance operation, parking assistance operation, vehicle braking operation, vehicle speed and acceleration operation, vehicle lateral motion operation, e.g., as part of the lane guidance, lane keeping and lane change operations, etc. As such, the braking command can be generated by the ADAS 40 independently from an action by the vehicle operator and in response to an autonomous control function.

Operator controls may be included in the passenger compartment of the target vehicle 10 and/or the second vehicle 110, respectively, and may include, by way of non-limiting examples, a steering wheel, an accelerator pedal, a brake pedal, and an operator interface device that is an element of the HMI system 60, such as a touch screen. The target vehicle 10 may have a horn actuator 28, and the second vehicle 110 has proximity alert actuator 128, which may be a horn actuator in one embodiment. The operator controls enable a vehicle operator to interact with and direct operation of the target vehicle 10 and the second vehicle 110, respectively, in functioning to provide passenger transportation.

The HMI system 60 provides for human/machine interaction, for purposes of directing operation of an infotainment system, the global positioning system (GPS) sensor 52, the navigation system 50, and the like, and includes a controller. The HMI system 60 monitors operator requests via operator interface device(s), and provides information to the operator including status of vehicle systems, service and maintenance information via the operator interface device(s). The HMI system 60 communicates with and/or controls operation of one or a plurality of the operator interface devices, wherein the operator interface devices are capable of transmitting a message associated with operation of one of the autonomic vehicle control systems. The HMI system 60 may also communicate with one or more devices that monitor biometric data associated with the vehicle operator, including, e.g., eye gaze location, posture, and head position tracking, among others. The HMI system 60 is depicted as a unitary device for ease of description, but may be configured as a plurality of controllers and associated sensing devices in an embodiment of the system described herein. Operator interface devices can include devices that are capable of transmitting a message urging operator action, and can include an electronic visual display module, e.g., a liquid crystal display (LCD) device having touch-screen capability, a heads-up display (HUD), an audio feedback device, a wearable device, and a haptic seat such as the driver's seat 26 that includes a plurality of haptic devices 27. The operator interface devices that are capable of urging operator action are preferably controlled by or through the HMI system 60. The HUD may project information that is reflected onto an interior side of a windshield of the vehicle, in the field-of-view of the operator, including transmitting a confidence level associated with operating one of the autonomic vehicle control systems. The HUD may also provide augmented reality information, such as lane location, vehicle path, directional and/or navigational information, and the like.

The target vehicle 10 and the second vehicle 110 may include telematics systems 70, 170, respectively. Each of the telematics systems 70, 170 includes a wireless telematics communication system capable of extra-vehicle communication, including communicating with a wireless communication network 100 having wireless and wired communication capabilities. The extra-vehicle communications may include short-range vehicle-to-vehicle (V2V) communication and/or vehicle-to-everything (V2x) communication, which may include communication with an infrastructure monitor, e.g., a traffic camera. Alternatively or in addition, the telematics systems 70, 170 may include wireless telematics communication systems that are capable of short-range wireless communication to a handheld device, e.g., a cell phone, a satellite phone or another telephonic device. In one embodiment the handheld device includes a software application that includes a wireless protocol to communicate with the telematics systems 170, and the handheld device executes the extra-vehicle communication, including communicating with an off-board server via the wireless communication network 100. Alternatively or in addition, the telematics systems 70, 170 may execute the extra-vehicle communication directly by communicating with the off-board server via the communication network.

Figure 3:
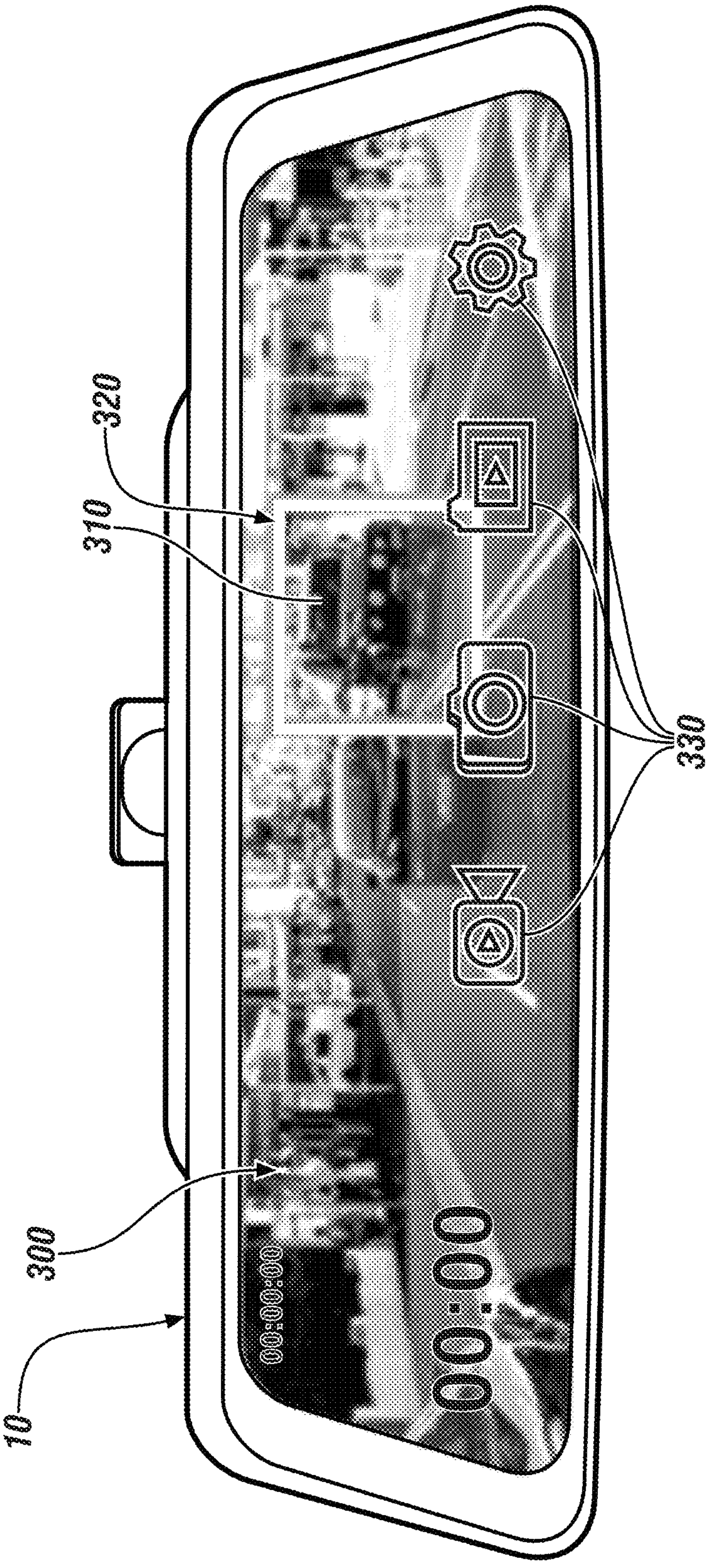
FIG. 3 pictorially illustrates a rear-view mirror for an embodiment of the target vehicle, in accordance with the disclosure.

FIG. 3 shows one embodiment of an operator interface device that is an element of the HMI system 60, in the form of an active rear-view mirror 300 that is arranged in the passenger cabin 20 of the target vehicle 10 of FIG. 1. The active rear-view mirror 300 includes a plurality of icons 330 and an identification box 320 highlighting a second vehicle 310. As described with reference to process 500, the identification box 320 can highlight or otherwise identify second vehicle 310, which is the source of the proximity alert that has generated the alarm in the target vehicle 10. Alternatively, the active rear-view mirror 300 may be arranged in the passenger cabin of the second vehicle 110 of FIG. 1, wherein the identification box 320 may be employed to identify a target vehicle to send a proximity alert that generates an alarm in the target vehicle 10.

Figure 4:
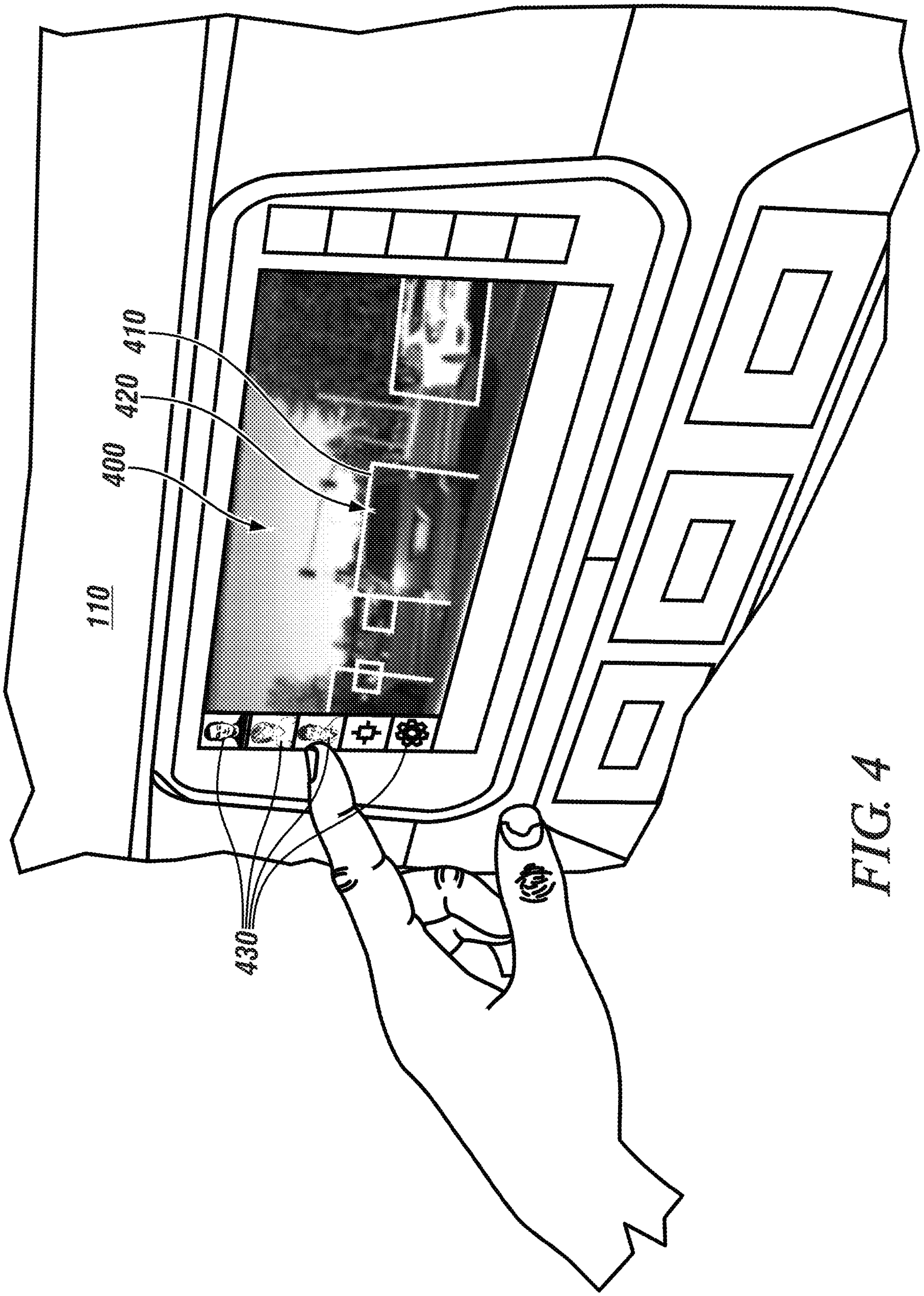
FIG. 4 pictorially illustrates a driver information center for an embodiment of the second vehicle, in accordance with the disclosure.

FIG. 4 shows another embodiment of an operator interface device that is an element of the HMI system 60, in the form of a Driver Information Screen 400 that is arranged on a front dash area of a passenger cabin of an embodiment of second vehicle 110. The Driver Information Screen 400 depicts, in one selectable screen, a frontward view of the vehicle, a plurality of icons 430 and identification box 420. The identification box 420 may be manipulated to highlight a target vehicle 410. As described with reference to process 500, the identification box 420 can be maneuvered to highlight or otherwise identify target vehicle 410, in order to send a proximity alert that generates an alarm in the target vehicle 410. Alternatively, the Driver Information Screen 400 may be arranged in the passenger cabin of the target vehicle 10 of FIG. 1, wherein the identification box 420 may be employed to identify a second vehicle that has sent the proximity alert that generates the alarm in the target vehicle 10.

The term "controller" and related terms such as microcontroller, control unit, processor and similar terms refer to one or various combinations of Application Specific Integrated Circuit(s) (ASIC), Field-Programmable Gate Array (FPGA), electronic circuit(s), central processing unit(s), e.g., microprocessor(s) and associated non-transitory memory component(s) in the form of memory and storage devices (read only, programmable read only, random access, hard drive, etc.). The non-transitory memory component stores machine readable instructions in the form of one or more software or firmware programs or routines, combinational logic circuit(s), input/output circuit(s) and devices, signal conditioning and buffer circuitry and other components that can be accessed by one or more processors to provide a described functionality. Input/output circuit(s) and devices include analog/digital converters and related devices that monitor inputs from sensors, with such inputs monitored at a preset sampling frequency or in response to a triggering event. Software, firmware, programs, instructions, control routines, code, algorithms, and similar terms mean controller-executable instruction sets including calibrations and look-up tables. Each controller executes control routine(s) to provide desired functions. Routines may be executed at regular intervals, for example each 100 microseconds during ongoing operation. Alternatively, routines may be executed in response to occurrence of a triggering event.

Communication between controllers, actuators and/or sensors may be accomplished using a direct wired point-to-point link, a networked communication bus link, a wireless link or another suitable communication link. Communication includes exchanging data signals in suitable form, including, for example, electrical signals via a conductive medium, electromagnetic signals via air, optical signals via optical waveguides, and the like. The data signals may include discrete, analog or digitized analog signals representing inputs from sensors, actuator commands, and communication between controllers.

The term "signal" refers to a physically discernible indicator that conveys information, and may be a suitable waveform (e.g., electrical, optical, magnetic, mechanical or electromagnetic), such as DC, AC, sinusoidal-wave, triangular-wave, square-wave, vibration, and the like, which is capable of traveling through a medium. A parameter is defined as a measurable quantity that represents a physical property of a device or other element that is discernible using one or more sensors and/or a physical model. A parameter can have a discrete value, e.g., either "1" or "0", or can be infinitely variable in value.

The terms 'dynamic' and 'dynamically' describe steps or processes that are executed in real-time and are characterized by monitoring or otherwise determining states of parameters and regularly or periodically updating the states of the parameters during execution of a routine or between iterations of execution of the routine.

The concepts described herein include a method, system, and apparatus that are arranged and configured to provide a directional, localized, vehicle-specific proximity alert to inform an operator of an embodiment of the target vehicle 10 of an impending risk from an embodiment of the second vehicle 110. The proximity alert is communicated from the second vehicle via an extra-vehicle communication system such as the telematics system 70. The proximity alert is manifested in the target vehicle 10 as one or more of a directional audible alarm from the stereo audio system 22, a directional visual alarm from the visual display system 24, and/or a directional haptic alarm from the plurality of haptic devices 27 in the driver's seat 26 within the passenger cabin 20.

As employed herein, the terms "alert", "proximity alert", and related terms refer to an audible or digital message that is sent from the second vehicle 110. As employed herein, the term "alarm" and related terms refer to an audible, visual, haptic, or other message that is generated and conveyed in the target vehicle 10 to the operator thereof.

The first controller 15 is in communication with the telematics system 70, and is operably connected to the interior audio system 22, the visual display 24, and, in one embodiment, the plurality of haptic devices 27 disposed in the driver's seat 26. The first controller 15 includes executable algorithmic code 16 that operates as follows.

A proximity alert may be generated by the second vehicle 110, and received at the target vehicle 10 via the telematics system 70 and/or the external microphone 45. In one embodiment, the proximity alert is in the form of an audible signal that is generated by a horn of the second vehicle 110. Alternatively, or in addition, the proximity alert is in the form of an electronic alert message that is communicated from the telematics system 170 of the second vehicle 110 to the telematics system 70 of the target vehicle 10. In one embodiment, the proximity alert includes a GPS location of the second vehicle 110.

When the second vehicle 110 employs some form of ADAS system 140, the proximity alert may be generated by the spatial monitoring system 142 based upon criteria related to dynamic parameters such range, azimuth, vehicle speed, and other data, which may indicate an imminent or unacceptable risk of collision.

When the second vehicle 110 has an audible horn 130 that is manually activated by depressing the proximity alert actuator 128 in the form of a horn button, the proximity alert may be manually generated by the driver of the second vehicle 110.

Both the audible signal generated by the horn 130 and the electronic alert message generated by the proximity alert actuator 128 have a directional component that may be defined in relation to the target vehicle 10. The location vector 80 may be determined between the second vehicle 110 and the target vehicle 10 at a point in time when the proximity alert is generated. The location vector 80 may have one or more of a range component and an azimuth component.

Figure 5:
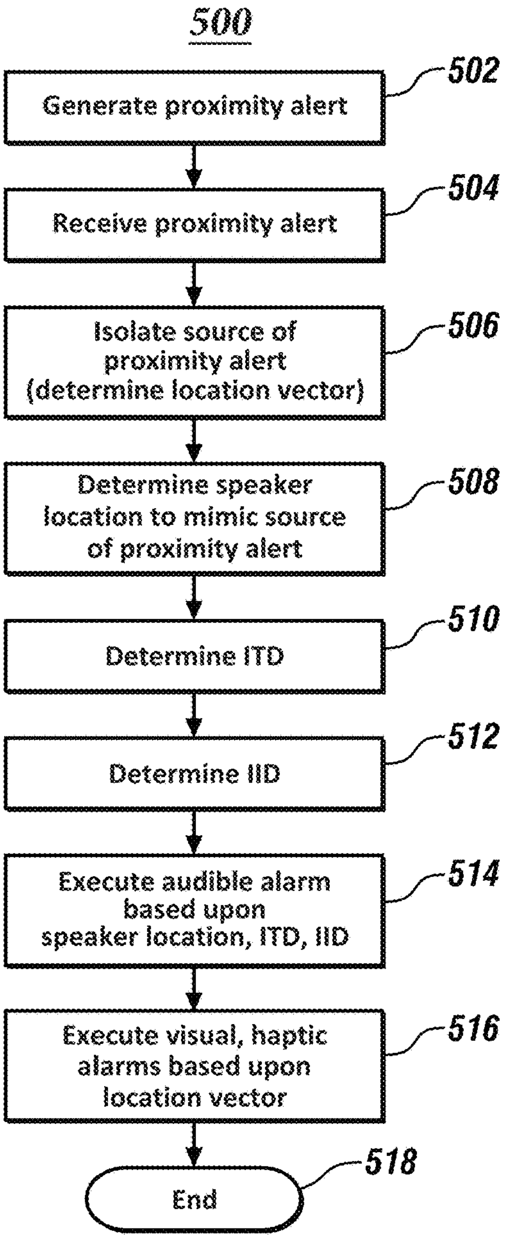
FIG. 5 schematically illustrates a flowchart for generating an alarm in an embodiment of a target vehicle in response to a proximity alert that originates at a second vehicle, in accordance with the disclosure.

Referring now FIG. 5, with continued reference to elements of FIGS. 1 through 4, a process 500 is described for generating, in the passenger cabin 20 of the target vehicle 10, one or more of an audible alarm, a visual alarm, and/or a haptic alarm in a manner that mimics a proximity alert from the second vehicle 110 in a manner that conveys the origination of the proximity alert, i.e., the spatial location of the second vehicle 110 in relation to the target vehicle 10.

The process 500 is illustrated as a collection of blocks in a logical flow graph, which represents a sequence of operations that can be implemented in hardware, software, or a combination thereof. In the context of software, the blocks represent computer instructions that, when executed by one or more processors, perform the recited operations. For convenience and clarity of illustration, the process 500 is described with reference to the target vehicle 10 and the second vehicle 110 that are described with reference to FIGS. 1 through 4.

TABLE 1

| BLOCK | BLOCK CONTENTS |
|---|---|
| 502 | Generate proximity alert |
| 504 | Receive proximity alert |
| 506 | Isolate source of proximity alert |
| 508 | Determine optimal audio speaker location to mimic source of proximity alert |
| 510 | Determine Interaural Time Difference (ITD) |
| 512 | Determine Interaural Intensity Difference (IID) |
| 514 | Execute audible alarm based upon speaker location, ITD, IID |
| 516 | Execute visual, haptic alarms based upon location vector |
| 518 | End |

Execution of the process 500 may proceed as follows. The steps of the process 500 may be executed in a suitable order, and are not limited to the order described with reference to FIG. 5.

The process 500 begins when a second vehicle 110 generates a proximity alert for communication to the target vehicle 10 indicating some form of imminent risk, such as risk of a collision (Step 502). A proximity alert can be generated when an operator of the second vehicle 110 depresses the proximity alert actuator 128 in the form of the horn button to generate an audible proximity alert that is captured by the microphone 45 of the target vehicle 10. Alternatively or in addition, when the operator of the second vehicle 110 actuates the proximity alert actuator 128 in the form of the horn button, the proximity alert may be communicated as a wireless message via the telematics system 170 to the telematics system 70 of the target vehicle 10 using V2X. Alternatively or in addition, the operator of the second vehicle 110 may identify the target vehicle 10 using the HMI 160, and communicate the proximity alert as a wireless message via the telematics system 170 to the telematics system 70 of the target vehicle 10 using V2X. Alternatively or in addition, the ADAS system 140 of the second vehicle 110 may include a software-based proximity alert actuator 128 to identify the target vehicle 10 employing input from the spatial monitoring system 142, and communicate the proximity alert as a wireless message via the telematics system 170 to the telematics system 70 of the target vehicle 10 using V2X.

The microphone 45 is advantageously capable of determining a direction and a sound intensity of the audible proximity alert.

The wireless message advantageously includes location information related to the second vehicle 110, e.g., a GPS location thereof.

The target vehicle 10 receives the proximity alert (Step 504) and isolates the source of the proximity alert (Step 506). Isolating and localizing the source of the proximity alert, i.e., localizing the second vehicle 110, may include employing the spatial monitoring system 42 to identify and account for interference paths and surrounding moveable and fixed objects. This may also include determining the range and azimuth of the location vector 80, which is defined in reference to the target vehicle 10.

An optimal audio speaker location in the passenger cabin 20 of the target vehicle 10 that mimics the source of the proximity alert from the second vehicle 110 is determined (Step 508) based upon the range and azimuth of the location vector 80.

The subsequent steps (Steps 510, 512, 514, and 516) are executed to generate one or more of an audible alarm, a visual alarm, and/or a haptic alarm in a manner that mimics the second vehicle 110 so that the operator of the target vehicle 10 is able to determine a location of the second vehicle 110 and act to avert, mitigate or otherwise minimize the risk being conveyed by the second vehicle 110.

This includes determining an Interaural Time Difference (ITD) (Step 510) and an Interaural Intensity Difference (IID) (Step 512).

The ITD refers to a time difference between an audible sound reaching a first, left ear of the vehicle operator and a second, right ear of the vehicle operator due to a location of the audible sound source. The time difference corresponds to an angle, as follows:

$$ITD=3\times r\times\sin(\theta/c)\text{ when }f<4000\text{ Hz}$$

$$ITD=2\times r\times\sin(\theta/c)\text{ when }f>4000\text{ Hz}$$

wherein:

- r represents distance from the audible sound source to the center of the operator's head,
- f represents sound frequency of the audible sound source, and
- θ represents angle or azimuth of the audible sound source.

Figure 6:
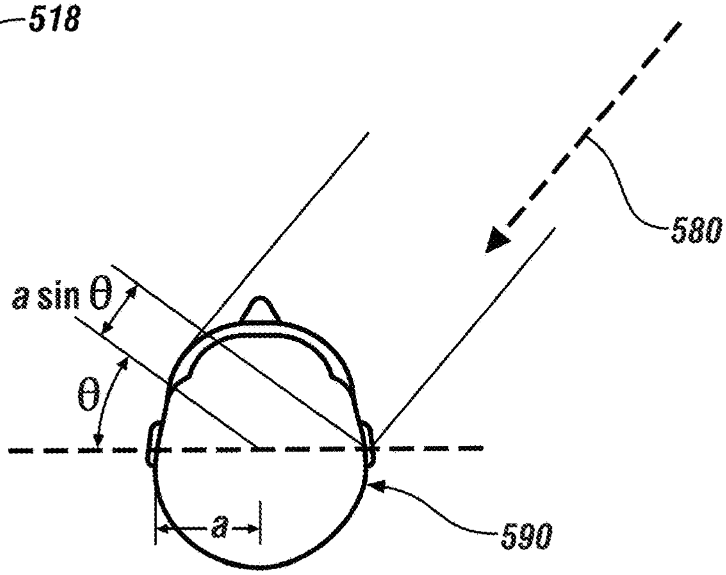
FIG. 6 schematically illustrates a top view of an exemplary operator's head, in accordance with the disclosure.

Representative embodiments of the dimensions are shown with reference to FIG. 6, including a vehicle operator's head 590 and vector 580.

The IID refers to an intensity difference between an audible sound reaching the first, left ear of the vehicle operator and the second, right ear of the vehicle operator due to the location of the audible sound source. The intensity difference corresponds to an angle, as follows:

$$IID=1+(f/1000)^{0.8}\times\sin(\theta)$$

wherein:

- f represents sound frequency of the audible sound source, and
- θ represents angle or azimuth of the audible sound source.

Furthermore, reflected sound waves from different speakers, e.g., the first, e.g., left speaker 23-1 and the second, e.g., right speaker 23-2, may allow the vehicle operator to localize two distinct sound sources. The reflected sound waves create frequency spectrum related to the following transfer functions:

$$H_L(r,\theta,\gamma,\omega,\alpha)=P_L(r,\theta,\gamma,\omega,\alpha)/P_0(r,\omega)$$

$$H_R(r,\theta,\gamma,\omega,\alpha)=P_R(r,\theta,\gamma,\omega,\alpha)/P_0(r,\omega)$$

wherein:

- r represents distance from the audible sound source to the center of the operator's head,
- f represents sound frequency of the audible sound source,
- θ represents angle or azimuth of the audible sound source,
- γ represents an elevation angle,
- ω represents an angular velocity,
- α represents a diameter of the operator's head,
- $H_L$, $H_R$ represent reflected sound wave amplitudes at the left and right ears, respectively,
- $P_L$, $P_R$ represent sound amplitudes at the left and right ears, respectively, and
- $P_0$ represents sound amplitude at the center of the operator's head.

The audible alarm that is generated by the stereo audio system 22 of the target vehicle 10 is generated by controlling the intensities and frequencies of audible sounds from the first, e.g., left speaker 23-1 and the second, e.g., right speaker 23-2 of the interior audio system based upon the ITD, the IID, the reflected sound wave amplitudes at the left and right ears of the operator. In this manner, the intensities and frequencies of the audible sounds from the first, e.g., left speaker 23-1 and the second, e.g., right speaker 23-2 of the interior audio system 22 may be directionally controlled to mimic the range and azimuth of sound emanating from the second vehicle 110 or from the proximity alert generated and wirelessly communicated from the second vehicle 110. The audible sounds may be pre-recorded in one embodiment (Step 514).

In embodiments where employed, the visual alarm and/or the haptic alarms are similarly generated (Step 516).

The audible alarm, the visual alarm, and/or the haptic alarm are discontinued after a period of time, or in response to another input (Step 518).

The flow chart of FIG. 5 is executed as algorithmic code in the first controller 15 employing executable instructions. The vehicle computing system communicating with the one or more modules may be implemented through a computer algorithm, machine executable code, non-transitory computer-readable medium, or software instructions programmed into a suitable programmable logic device(s) of the vehicle, such as the one or more modules, the entertainment module, a server in communication with the vehicle computing system, a mobile device communicating with the vehicle computing system and/or server, other controller in the vehicle, or a combination thereof. Although the various steps shown in the flowchart diagram appear to occur in a chronological sequence, at least some of the steps may occur in a different order, and some steps may be performed concurrently or not at all.

The flowchart and block diagrams in the flow diagrams illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by dedicated-function hardware-based systems that perform the specified functions or acts, or combinations of dedicated-function hardware and computer instructions. These computer program instructions may also be stored in a computer-readable medium that can direct a computer or other programmable data processing apparatus to function in a particular manner, such that the instructions stored in the computer-readable medium produce an article of manufacture including instruction set that implements the function/act specified in the flowchart and/or block diagram block or blocks.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the claims.

What is claimed is:

1. A system for a target vehicle, comprising:

an extra-vehicle communication system;

a passenger cabin including an interior audio system, a visual display, and an active rear-view mirror configured to identify a second vehicle; and a controller;

the controller being in communication with the extra-vehicle communication system, and operably connected to the active rear-view mirror, interior audio system, and the visual display;

the controller including algorithmic code that is executable to:

receive a proximity alert from the second vehicle via the extra-vehicle communication system, determine a location vector between the second vehicle and the target vehicle based upon the proximity alert, control the active rear-view mirror to highlight the second vehicle in the active rear-view mirror, and control the interior audio system and the visual display to generate an alarm in the passenger cabin in response to the proximity alert, wherein the alarm generated by the interior audio system and the visual display is directionally controlled based upon the location vector.

2. The system of claim 1, further comprising a microphone arranged to monitor audio sound external to the target vehicle;

wherein the controller is in communication with the extra-vehicle communication system and the microphone; and wherein the controller includes algorithmic code that is executable to receive the proximity alert from the second vehicle via at least one of the extra-vehicle communication system and the microphone.

3. The system of claim 1, wherein the extra-vehicle communication system comprises a telematics system arranged to execute vehicle-to-vehicle communication.

4. The system of claim 1, wherein the interior audio system comprises a stereo system including a first speaker disposed on a left side of the passenger cabin and a second speaker disposed on a right side of the passenger cabin.

5. The system of claim 4, further comprising the controller including algorithmic code that is executable to:

determine an inter-aural time difference for a vehicle operator based upon the location vector between the second vehicle and the target vehicle; and control the first speaker and the second speaker to generate the alarm in response to the proximity alert based upon the inter-aural time difference for the vehicle operator.

6. The system of claim 1, wherein the visual display further comprises one of a head-up display, a driver information center, vehicle interior lighting, or sideview mirrors.

7. The system of claim 1, further comprising the controller including algorithmic code that is executable to:

determine a location of the second vehicle based upon the location vector; and display, via the visual display, the location of the second vehicle.

8. The system of claim 1, wherein the controller is operably connected to the interior audio system and the visual display, and wherein the controller includes algorithmic code that is executable to:

control the interior audio system and the visual display to generate the alarm in the passenger cabin in response to the proximity alert, wherein an origin of the alarm from the interior audio system and the visual display is determined based upon the location vector.

9. The system of claim 1, further comprising:

a plurality of haptic devices disposed in an operator seat; and the controller being operably connected to the plurality of haptic devices;

wherein the controller includes algorithmic code that is executable to control the plurality of haptic devices to generate the alarm in response to the proximity alert, wherein the alarm generated by the plurality of haptic devices is directionally controlled based upon the location vector.

10. The system of claim 1, further comprising the controller including algorithmic code that is executable to:

control the interior audio system to generate the alarm in response to the proximity alert, wherein the alarm generated by the interior audio system is directionally controlled to mimic the proximity alert from the second vehicle.

11. A system, comprising:

a target vehicle, including a first communication system, a passenger cabin including an interior audio system and a visual display, and a first controller, the first controller being in communication with the first communication system, and operably connected to the interior audio system and the visual display;

a second vehicle, including a second communication system, a proximity alert actuator, and a second controller, the second controller being in communication with the second communication system and the proximity alert actuator;

a target active rear-view mirror disposed in the passenger cabin of the target vehicle and configured to identify the second vehicle, wherein the target active rear-view mirror is operably connected to the first controller;

a second active rear-view mirror disposed in the second vehicle and configured to identify the target vehicle, wherein the second active rear-view mirror is operably connected to the second controller;

wherein the second controller includes algorithmic code that is executable to:

control the second active rear-view mirror to identify the target vehicle for communicating a proximity alert to the target vehicle; and communicate the proximity alert to the first controller via the first and second communication systems; and wherein the first controller includes algorithmic code that is executable to:

determine a location vector between the second vehicle and the target vehicle based upon the proximity alert, control the target active rear-view mirror to highlight the second vehicle in the target active rear-view mirror, and control the interior audio system and the visual display of the target vehicle to generate an alarm in the passenger cabin of the target vehicle in response to the proximity alert, wherein the alarm generated by the interior audio system and the visual display is directionally controlled based upon the location vector.

12. The system of claim 11, further comprising:

the second vehicle including a spatial monitoring system;

wherein the proximity alert actuator is incorporated into the spatial monitoring system; and wherein the proximity alert is generated by the spatial monitoring system based upon a proximity of the target vehicle in relation to the second vehicle.

13. The system of claim 11, wherein the proximity alert actuator comprises a horn button, and wherein the proximity alert is generated by operator actuation of the horn button.

14. The system of claim 11, wherein the interior audio system comprises a stereo system including a first speaker disposed on a left side of the passenger cabin of the target vehicle and a second speaker disposed on a right side of the passenger cabin of the target vehicle.

15. The system of claim 14, further comprising the first controller including algorithmic code that is executable to:

determine an inter-aural time difference for a vehicle operator based upon the location vector between the second vehicle and the target vehicle; and control the first speaker and the second speaker to generate the alarm in response to the proximity alert based upon the inter-aural time difference for the vehicle operator.

16. The system of claim 11, wherein the visual display of the target vehicle comprises one of a head-up display, a driver information center, vehicle interior lighting, or sideview mirrors.

17. The system of claim 11, further comprising the first controller having algorithmic code that is executable to:

determine a location of the second vehicle based upon the location vector; and display, via the visual display, the location of the second vehicle.

18. The system of claim 11, wherein the first controller is operably connected to the interior audio system and the visual display, and wherein the first controller includes algorithmic code that is executable to:

control the interior audio system and the visual display to generate the alarm in the passenger cabin of the target vehicle in response to the proximity alert, wherein an origin of the alarm from the interior audio system and the visual display is determined based upon the location vector.

19. The system of claim 11, further comprising:

a plurality of haptic devices disposed in an operator seat of the target vehicle; and the first controller being operably connected to the plurality of haptic devices;

wherein the first controller includes algorithmic code that is executable to control the plurality of haptic devices to generate the alarm in response to the proximity alert, wherein the alarm generated by the plurality of haptic devices is directionally controlled based upon the location vector.

20. A method for controlling a target vehicle, the method comprising:

conveying a proximity alert from a second vehicle via a wireless communication system;

determining a location vector, wherein the location vector is defined based upon a location of the second vehicle in relation to the target vehicle;

controlling an active rear-view mirror of the target vehicle to highlight the second vehicle in the active rear-view mirror, and controlling an interior audio system and a visual display of the target vehicle to generate an alarm in response to the proximity alert, wherein the alarm generated by the interior audio system and the visual display is directionally controlled based upon the location vector.

* * * * *